United States Patent
Miyairi et al.

(10) Patent No.: US 7,359,412 B2
(45) Date of Patent: Apr. 15, 2008

(54) LASER APPARATUS, LASER IRRADIATION METHOD, AND MANUFACTURING METHOD OF SEMICONDUCTOR DEVICE

(75) Inventors: Hidekazu Miyairi, Tochigi (JP); Akihisa Shimomura, Kanagawa (JP); Tamae Takano, Kanagawa (JP); Masaki Koyama, Kanagawa (JP); Koichiro Tanaka, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 362 days.

(21) Appl. No.: 10/658,472

(22) Filed: Sep. 10, 2003

(65) Prior Publication Data
US 2004/0052279 A1    Mar. 18, 2004

(30) Foreign Application Priority Data
Sep. 13, 2002  (JP) ............................ 2002-268222
Sep. 20, 2002  (JP) ............................ 2002-274220

(51) Int. Cl.
*H01S 3/13* (2006.01)
(52) U.S. Cl. ............................ 372/29.01; 372/29.02; 372/29.023; 372/30; 372/31
(58) Field of Classification Search ............ 372/25–33; 117/92; 219/121.6
See application file for complete search history.

(56) References Cited

U.S. PATENT DOCUMENTS 4,092,530 A *   5/1978  Wise ........................... 250/205
4,977,573 A    12/1990  Bittenson et al.
5,128,601 A *   7/1992  Orbach et al. ................ 372/30

(Continued)

FOREIGN PATENT DOCUMENTS

JP        07-038180         2/1995

OTHER PUBLICATIONS

Hideki Kusama, "Excimer Laser Annealing Apparatus", Liquid Crystal Display Technology 2001, Liquid Crystal Display Manufacturing Technology Edition, pp. 138-141; Jul. 1, 2001, (Japanese Article with Full Translation).

*Primary Examiner*—Armando Rodriguez
*Assistant Examiner*—Phillip Nguyen
(74) *Attorney, Agent, or Firm*—Nixon Peabody LLP; Jeffrey L. Costellia

(57) ABSTRACT

It is an object to provide a laser apparatus, a laser irradiating method and a manufacturing method of a semiconductor device that make laser energy more stable. To attain the object, a part of laser beam emitted from an oscillator is sampled to generate an electric signal that contains as data energy fluctuation of a laser beam. The electric signal is subjected to signal processing to calculate the frequency, amplitude, and phase of the energy fluctuation of the laser beam. The transmittance of a light amount adjusting means is controlled in order that the transmittance changes in antiphase to the phase of the energy fluctuation of the laser beam and with an amplitude capable of reducing the amplitude of laser beam emitted from the oscillator, the control being made based on the phase difference between the phase of a signal that is in synchronization with oscillation of laser beam emitted from the oscillator and the phase calculated, on the energy ratio of the sampled laser beam to laser beam emitted from the oscillator, and on the frequency and amplitude calculated. In the light amount adjusting means, energy of the laser beam oscillated from the oscillator energy is adjusted.

8 Claims, 14 Drawing Sheets
(1 of 14 Drawing Sheet(s) Filed in Color)

U.S. PATENT DOCUMENTS

| | | | |
|---|---|---|---|
| 5,157,676 A * | 10/1992 | Wilcox | 372/29.021 |
| 5,544,182 A * | 8/1996 | Nagaishi et al. | 372/29.021 |
| 5,754,571 A * | 5/1998 | Endoh et al. | 372/20 |
| 5,854,803 A | 12/1998 | Yamazaki et al. | |
| 5,856,880 A * | 1/1999 | Farina et al. | 349/20 |
| 6,059,873 A | 5/2000 | Yamaguchi et al. | |
| 6,078,390 A * | 6/2000 | Bengtsson | 356/318 |
| 6,078,599 A * | 6/2000 | Everage et al. | 372/20 |
| 6,091,047 A * | 7/2000 | Miyakawa et al. | 219/121.68 |
| 6,166,845 A | 12/2000 | Ito et al. | |
| 6,210,996 B1 | 4/2001 | Yamazaki et al. | |
| 6,336,969 B1 | 1/2002 | Yamaguchi et al. | |
| 6,455,359 B1 | 9/2002 | Yamazaki et al. | |
| 6,468,842 B2 | 10/2002 | Yamazaki et al. | |
| 6,501,061 B1 * | 12/2002 | Kitai et al. | 250/205 |
| 6,583,399 B1 * | 6/2003 | Hunziker et al. | 250/214 R |
| 6,706,570 B2 | 3/2004 | Yamazaki et al. | |
| 6,707,031 B1 * | 3/2004 | Weinberger et al. | 250/281 |
| 6,784,030 B2 | 8/2004 | Yamazaki et al. | |
| 6,878,899 B2 * | 4/2005 | Smart | 219/121.61 |
| 7,223,306 B2 * | 5/2007 | Miyairi et al. | 117/92 |
| 2004/0203248 A1 | 10/2004 | Miyairi et al. | |
| 2005/0023255 A1 | 2/2005 | Yamazaki et al. | |

* cited by examiner

Fig. 2A oscillation frequency 10Hz
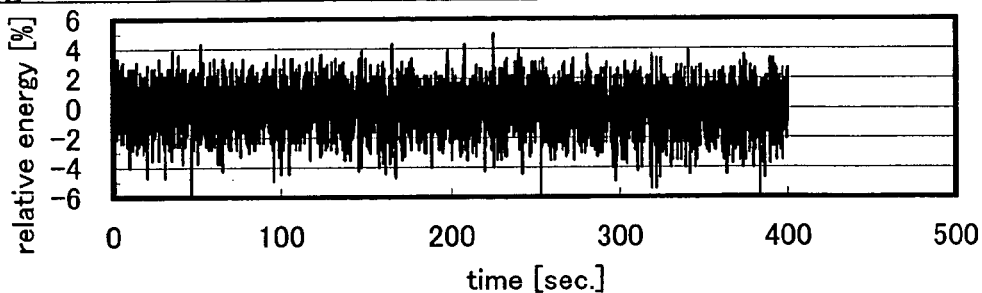
Fig. 2B oscillation frequency 20Hz
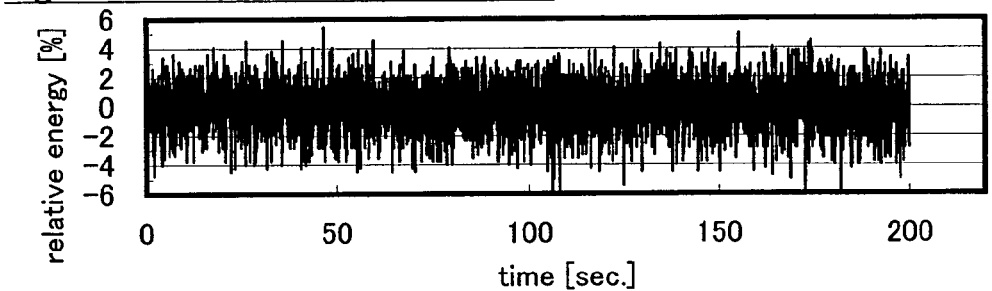
Fig. 2C oscillation frequency 30Hz
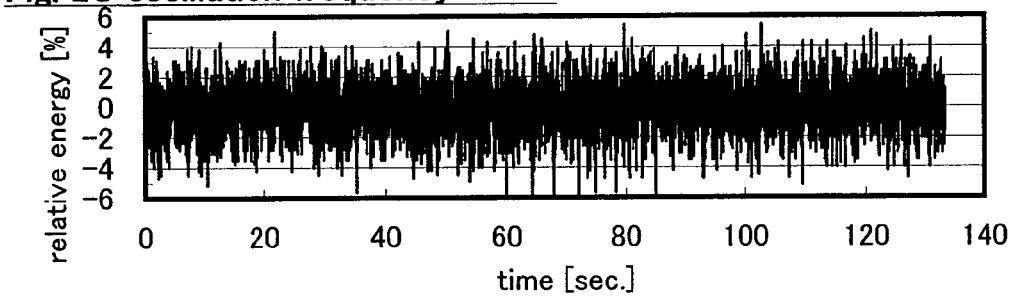
Fig. 2D oscillation frequency 40Hz
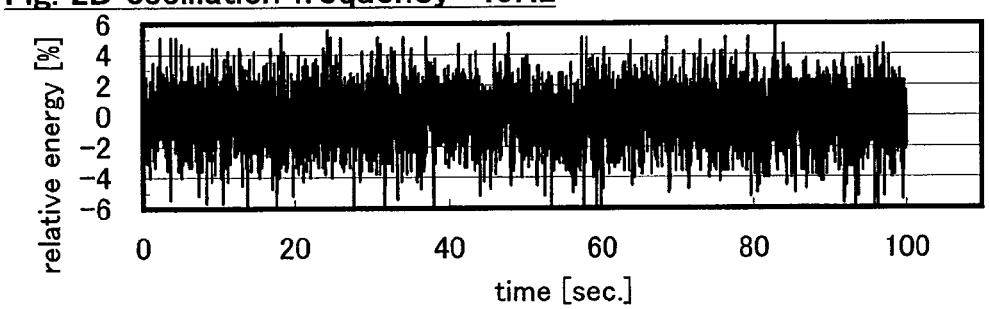
Fig. 2E oscillation frequency 50Hz
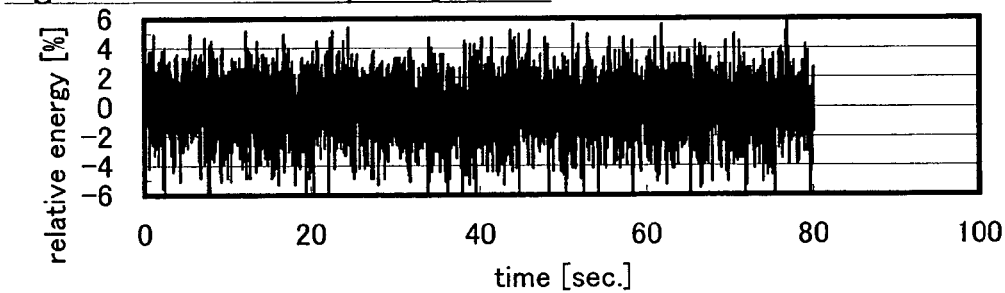

Fig. 3A oscillation frequency 10Hz (after Fourier transformation)
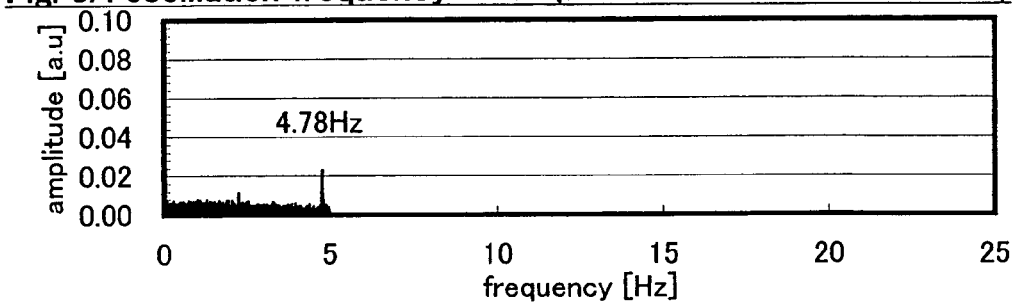
Fig. 3B oscillation frequency 20Hz (after Fourier transformation)
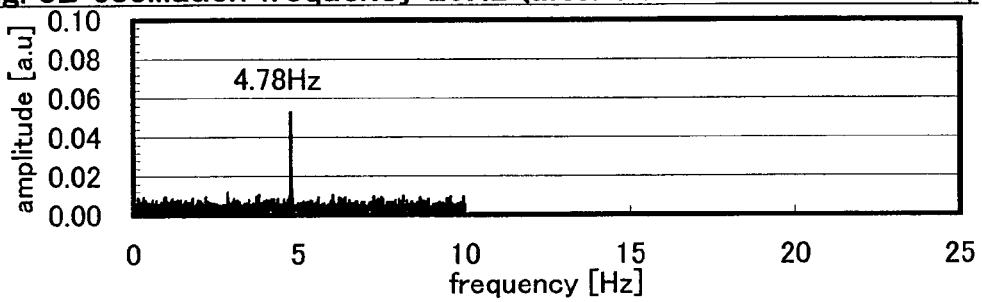
Fig. 3C oscillation frequency 30Hz (after Fourier transformation)
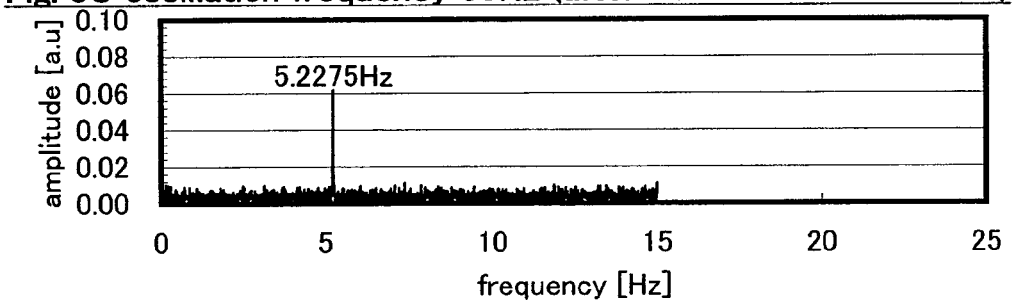
Fig. 3D oscillation frequency 40Hz (after Fourier transformation)
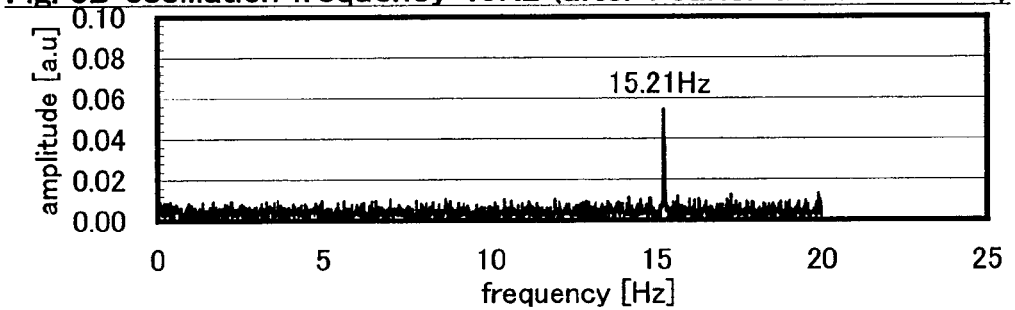
Fig. 3E oscillation frequency 50Hz (after Fourier transformation)
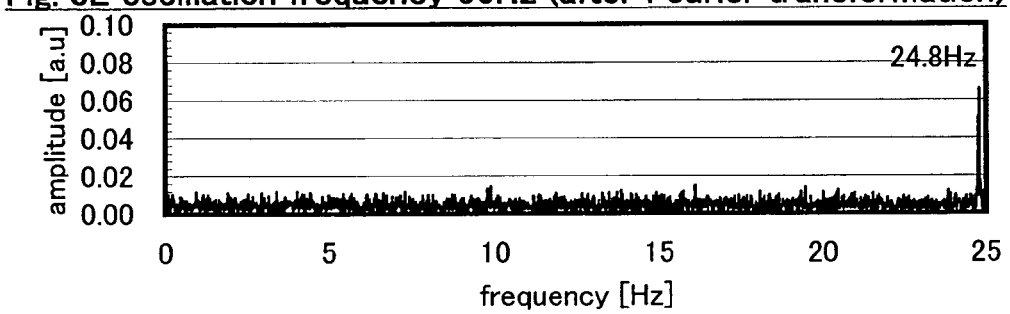

Fig. 4A fluctuation of output
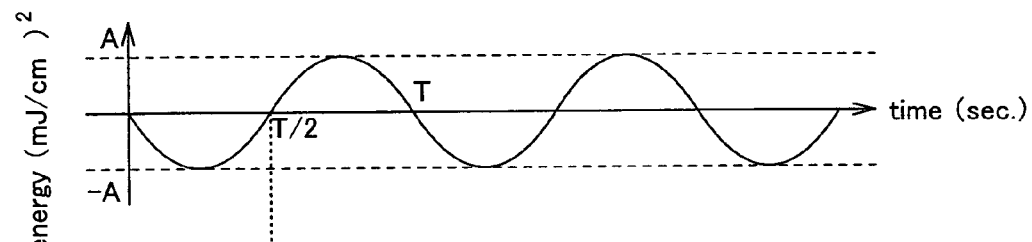
Fig. 4B fluctuation of transmiattance
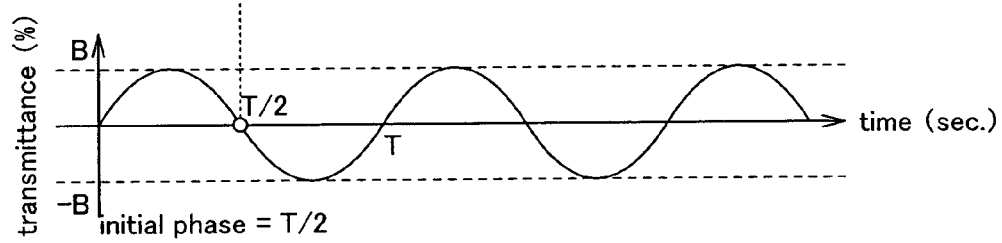

Fig. 5A
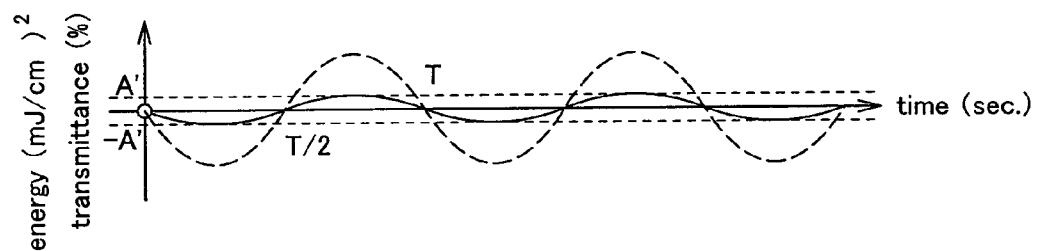
Fig. 5B  initial phase ≠ π
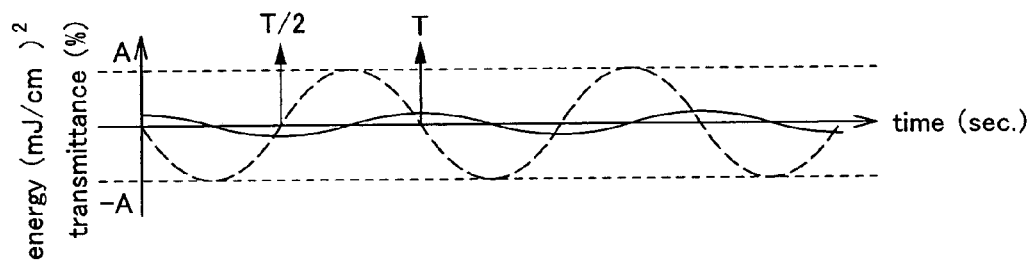

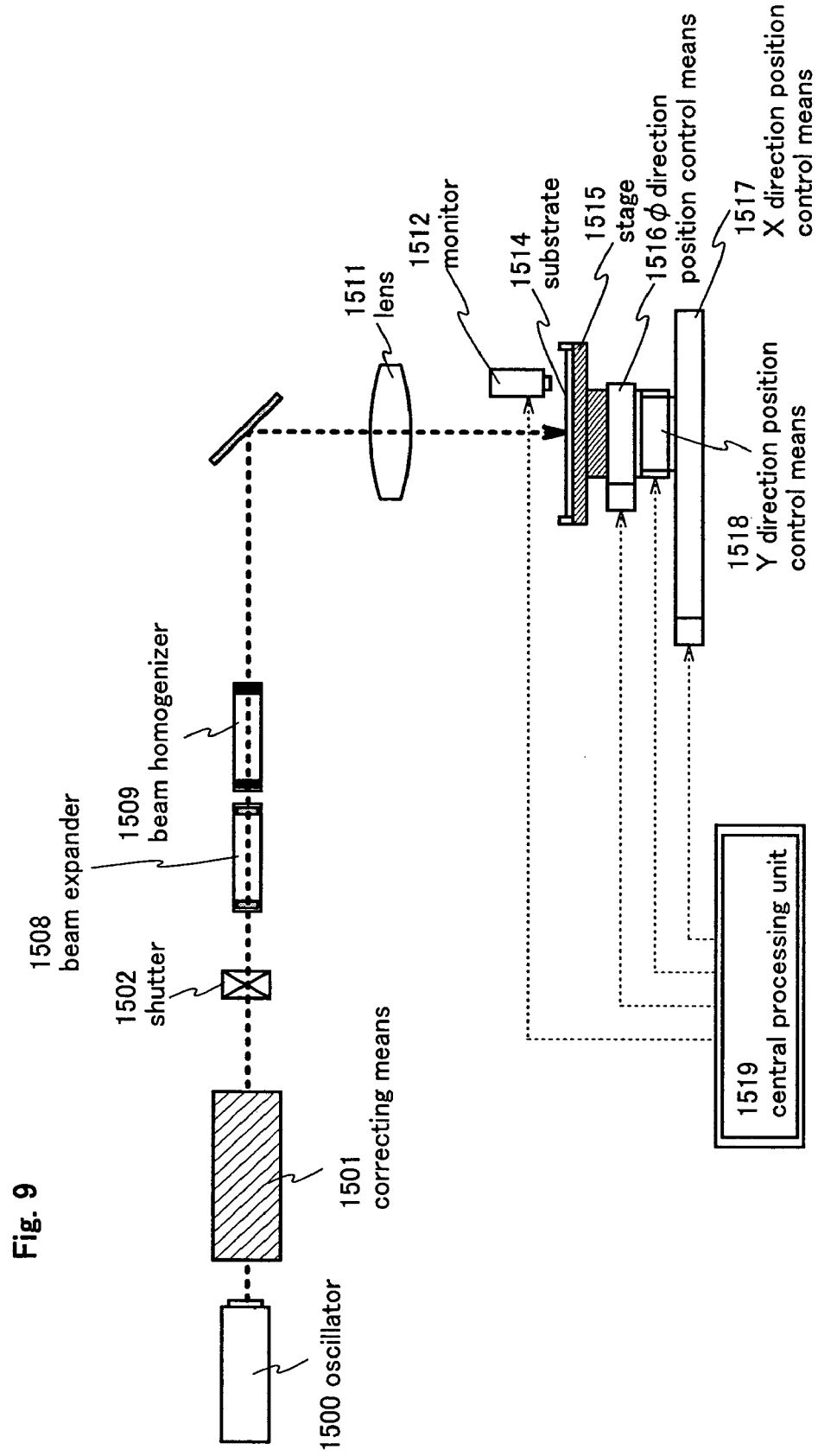

Fig. 10A  before FFT
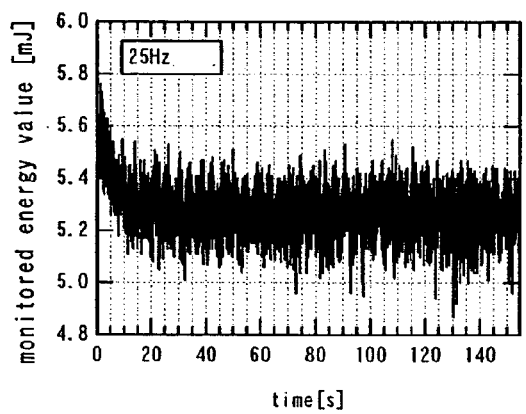
Fig. 10B  after FFT
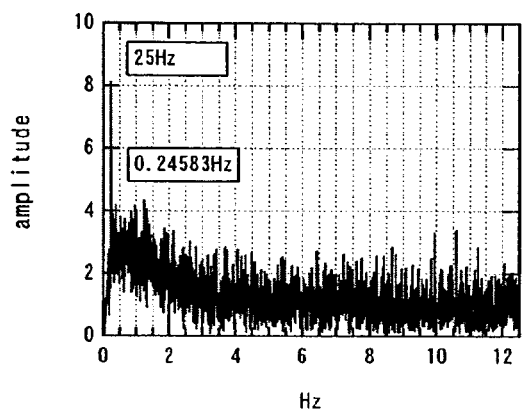

light and shade exhibiting an energy difference semiconductor film after crystallization Difference between entire photograph and
panel display photograph after laser crystallization

LASER APPARATUS, LASER IRRADIATION METHOD, AND MANUFACTURING METHOD OF SEMICONDUCTOR DEVICE

BACKGROUND OF THE INVENTION

1. Field of the Invention

The present invention relates to a laser apparatus and a laser irradiation method, specially a laser apparatus and a laser irradiation method that have a function to stabilize energy of an irradiated laser beam. The present invention also relates to a manufacturing method of a semiconductor device including a step for crystallizing a semiconductor film by the laser apparatus and the laser irradiation method.

2. Description of the Related Arts

Lasers are classified into a gas laser and a solid-state laser according to a laser medium and have various kinds. In the lasers, obtained wavelengths, energy values and pulse characteristics are different depending on the laser mediums. Applications of lasers have been searched according to characteristics of laser beams. Of the various lasers, YAG laser, $CO_2$ laser, excimer laser and the like are mainly used for many industrial laser apparatuses.

An excimer laser of a gas laser emits an intensive ultraviolet beam and has a short wavelength by ArF (0.193 μm) and a short wavelength by XeF (0.351 μm). Further, an excimer laser is superior in light condensing. Therefore the excimer laser is suitable for a field in which a super microfabrication at μm level is required as typified by a semiconductor manufacturing including a mask forming, in addition to general parts processing.

Generally, in a gas laser typified by an excimer laser or a $CO_2$ laser, a pressure fluctuation of a gas that is a laser medium is easily generated in an oscillator, or a fluctuation in gas flow rate is also easily generated in the case that circulating a gas of a laser medium to oscillate in a electric discharge tube. As a result, there is a problem that it is difficult to stabilize energy of an irradiated laser beam from the oscillator and to perform a process to an object evenly.

Conventionally, a pressure fluctuation of a laser medium in a electric discharge tube is detected and another a pressure fluctuation to counteract the fluctuation is generated to suppress the pressure fluctuation or a fluctuation in flow rate of a laser medium, in order to stabilize energy of an irradiated laser beam (Reference 1: Japanese Patent Laid-Open No. Hei 07-038180).

The above reference 1 describes as follows: a pressure fluctuation of a gas that is laser medium is detected in a pressure sensor provided in a gas supplying duct and is input to a feedback control unit as a detection signal. A phase of the detection signal is inverted in the feedback control unit and the detection signal having the inverted phase is subjected to a frequency analysis by fast Fourier transform (FFT) to obtain a waveform signal in a waveform generator. After the waveform signal is amplified, it is input to a wave transducer. The wave transducer generates a pressure fluctuation of the inverted phase with the same amplitude as that of the pressure fluctuation detected by a pressure sensor to counteract the pressure fluctuation of the laser medium.

SUMMARY OF THE INVENTION

The above method has a limit, however, to suppress a pressure fluctuation of a laser medium because it is difficult to accurately generate a pressure fluctuation of an inverted phase in a wave transducer. A fluctuation of energy of a laser beam irradiated from an excimer laser is smaller than that of $CO_2$ laser shown in the above Reference 1. However, the excimer laser is widely used for microfabrication, since it has an advantage of superiority in light gathering, so that it is desired that the excimer laser has better stability than the $CO_2$ laser. Accordingly, in such method as the above method that the pressure fluctuation of the laser medium is counteracted using a transducer, it is difficult that a level of stability in energy of the irradiated laser beam reaches a satisfactory level.

When an output of a laser beam is not stable, it is difficult to perform a process to an object evenly. For example, in crystallization of a semiconductor film by an irradiation of a laser beam, it is thought that a difference in the crystallinity is made by ten percent of a subtle energy fluctuation.

The present inventors took a sample of a part of a laser beam irradiated from an excimer laser of pulse oscillator and observed energy fluctuation. FIG. 10A shows an energy value of the sampled laser beam to time. It is noted that a frequency of the excimer laser is set to 25 Hz.

FIG. 10B shows data that are obtained by performing FFT to the data shown in FIG. 10A. In FIG. 10B, the horizontal axis shows frequency whereas the vertical axis shows amplitude. Of data that are converted by FFT, by far the highest peak is observed at a frequency of 0.24583 Hz. This frequency corresponds to a frequency of energy fluctuation at a periodic fluctuation of energy of laser beams observed in FIG. 10A.

In a period from the start of measuring to 20 sec in FIG. 10A, the data after converting by FFT is the same, whether the data cut during this period is performed or not, although energy fluctuation is larger than others due to an excessive response of a detector in a measuring equipment.

Provided that the above laser beam having energy fluctuation is scanned at the speed of 0.8 mm/sec to crystallize a semiconductor film, a laser beam having the highest energy density is irradiated to the semiconductor film at the interval given by the formula 0.8/0.24583≈3.3 mm.

FIG. 11 is a photograph of a top of a semiconductor film that is actually subjected to a laser beam of the excimer laser to be crystallized. The laser beam is irradiated to the semiconductor film using the excimer laser of a pulse oscillator at oscillation frequency of 25 Hz and at a scanning speed of 0.8 mm/sec. In the photograph of the semiconductor film shown in FIG. 11, a plurality of lateral streaks caused by a difference in crystallinity can be seen in the direction perpendicular to the scanning direction denoted by an arrow. The plurality of lateral streaks are shown with a gap of 3.4 mm. The value is the almost same as the value (3.3 mm) of the above formula. Therefore, the plurality of lateral streaks are caused by periodic fluctuation of energy.

Further, a photograph of the top of the crystallized semiconductor film and a drawing in which a part of the laser beam irradiated from the excimer laser pulse oscillator is sampled and the energy value is shown using fifteen gradation are shown side by side in FIG. 12. The oscillation frequency of the laser beam shown in FIG. 12 is set to 30 Hz and the scanning speed is set to 1.0 mm/sec. The direction of scanning is the direction as the arrow shows. In a portion that shows strength and weakness of color with the gradation, there is a successive white portion at the start of scanning because of an excessive response in a measuring equipment.

As shown in FIG. 12, the plurality of lateral streaks caused by the difference in crystallity can be seen in the crystallized semiconductor film, in the direction perpendicular to the scanning direction. The plurality of lateral streaks caused by periodic fluctuation of energy are shown by the gradation that shows strength and weakness of energy. The two kinds of lateral streaks have the same interval. Therefore, FIG. 12 also shows that the plurality of lateral streaks caused by the difference in crystallity in the semiconductor film are resulted from periodic fluctuation of energy.

In this way, when a thin film transistor (TFT) is made from a semiconductor film having a fluctuation in crystallity, an ON current thereof is varied depending on a position in the semiconductor film. There is a problem that a region of high luminance and a region of low luminance can be seen in striped shape in a light emitting device using TFTs as transistors that control a current supplied to light emitting elements.

FIG. 13 shows a photograph of a top of a crystallized semiconductor film by a laser beam and a photograph of top view of a state in which a whole white surface is displayed in a light emitting device using the semiconductor film. Specifically, a plurality of TFTs formed with the crystallized semiconductor film and a plurality of pixels having light emitting elements in which currents to be supplied are controlled by the TFTs are provided in a pixel portion in the light emitting device. It is noted that an electroluminescence material is used to obtain luminescence generated by applying electric field in the light emitting element FIG. 13 is a photograph that shows parts of a pixel portions of the light emitting device 2001, 2002 and 2003 overlapping on a semiconductor film 2000. The parts of the pixel portions of the light emitting device 2001, 2002 and 2003 have different gradation to display from each other.

It is difficult to observe the lateral streaks of the parts of the pixel portions of the light emitting device 2002 and 2003, whereas the lateral streaks can be observed in the part of the pixel portion of the light emitting device 2001. The lateral streaks agree with the lateral streaks of the semiconductor film. Therefore, it is observed that the plurality of lateral streaks in displaying of the light emitting device are resulted from energy fluctuation of the laser beam.

The present invention has been made in view of the above problems. It is an object of the present invention to provide a laser apparatus, a laser irradiation method that can stabilize energy of a laser beam more and a manufacturing method of a semiconductor device thereby.

The inventors of the present invention have thought of employing means for adjusting the light amount (light amount adjusting means) of a laser beam outputted from an oscillator as a more effective solution to stabilize the laser beam energy than the conventional one which reduces fluctuation in pressure and flow rate of a medium in a laser oscillator.

In the present invention, a part of laser beam emitted from an oscillator is sampled to grasp energy fluctuation of the laser beam. The thus obtained energy fluctuation data is used in controlling the transmittance of the light amount adjusting means to make the transmittance change in antiphase to the phase of the fluctuation.

Specifically, correcting means included in a laser apparatus of the present invention are as follows:

(1) a light amount adjusting means for adjusting energy of incident laser beam in accordance with transmittance;

(2) means for sampling a part of a laser beam that enters a light amount adjusting means (entrance side optical system);

(3) means for generating, from a partial laser beam sampled by an entrance side optical system, a first electric signal that contains as data energy fluctuation of a laser beam that enters a light amount adjusting means (entrance side sensor);

(4) means for sampling a part of laser beam adjusted by a light amount adjusting means (exit side optical system);

(5) means for generating, from a partial laser beam sampled by an exit side optical system, a second electric signal that contains as data energy fluctuation of a laser beam of which energy has been adjusted by a light amount adjusting means (exit side sensor);

(6) means for subjecting the first electric signal and the second electric signal to signal processing to grasp an energy fluctuation state of a laser beam that enters a light amount adjusting means as well as an energy fluctuation state of a laser beam adjusted by a light amount adjusting means, the means controlling the driver such that transmittance changes in antiphase to the phase of energy fluctuation of the laser beam that enters the light amount adjusting means (signal processing unit); and (7) means for controlling transmittance of a light amount adjusting means (driver).

Employing an attenuator (ATT) or like other light amount adjusting means for adjusting the laser beam energy density as in the above structure makes it possible to control the laser beam energy density with precision. Therefore, laser beam fluctuation can be cancelled out more securely than by the conventional method which uses a transducer and obtained laser beam can have steadier energy. More specifically, laser beam energy fluctuation which occurs periodically can be prevented.

The inventors of the present invention have also thought of controlling the voltage to be applied to an electric discharge tube of an oscillator as a more effective solution to stabilize the laser beam energy than the conventional one which reduces fluctuation in pressure and flow rate of a medium in a laser oscillator.

In the present invention, a part of laser beam emitted from an oscillator is sampled to grasp energy fluctuation of the laser beam. The thus obtained energy fluctuation data is used in controlling the voltage to be applied to an electric discharge tube to make the voltage change in antiphase to the phase of the fluctuation.

Specifically, correcting means included in a laser apparatus of the present invention are as follows:

(1) means for sampling a part of laser beam emitted from an oscillator (optical system);

(2) means for generating, from a partial laser beam sampled by an optical system, an electric signal that contains as data energy fluctuation of a laser beam (sensor);

(3) means for subjecting the electric signal to signal processing to grasp the energy fluctuation state of the laser beam, the means controlling the voltage controlling means such that the voltage to be applied to the electric discharge tube of the oscillator changes in antiphase to the phase of the energy fluctuation of the laser beam (signal processing unit); and (4) means for controlling the voltage to be applied to the electric discharge tube (voltage control means).

Controlling the voltage to be applied to an electric discharge tube of a laser oscillator as in the above structure makes it possible to control the laser beam energy density with precision. Therefore, laser beam fluctuation can be cancelled out more securely than by the conventional method which uses a transducer and obtained laser beam can have steadier energy. More specifically, periodic cycle of energy fluctuation than rather than oscillation cycle of a laser beam can be suppressed.

When the above laser apparatus is used in crystallizing a semiconductor film, the semiconductor film can have more uniform crystallinity. A semiconductor device manufacturing method of the present invention can be used to manufacture integrated circuits and semiconductor display devices. In particular, when the method is used for a semiconductor element such as a transistor in a pixel portion of a semiconductor display device, for example, a liquid crystal display device, a light emitting device which has in each pixel a light emitting element, typically, an organic light emitting element, a DMD (Digital Micromirror Device), PDP (Plasma Display Panel), or an FED (Field Emission Display), lateral streaks due to energy distribution of laser beam used to irradiate the pixel portion is prevented from being recognized visually.

The present invention is applicable to excimer lasers, $CO_2$ lasers, and other gas lasers. In addition to gas lasers, the present invention can be applied to solid-state lasers. Moreover, the present invention is not limited to pulse oscillation and is also applicable to continuous wave laser apparatus.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

In the accompanying drawings:

FIGS. 2A to 2E are graphs showing measured energy value corresponding to oscillation frequency;

FIGS. 3A to 3E are graphs showing data after performing FFT to measured value of energy corresponding to oscillation frequency;

FIGS. 4A and 4B are graphs showing periodic fluctuation of energy and transmittance fluctuation;

FIGS. 5A and 5B are graphs showing energy fluctuation of a laser beam irradiated from a light amount adjusting means;

FIG. 9 shows a structure of a laser apparatus according to the present invention;

FIGS. 10A and 10B are a graph showing an energy value of a laser beam to time and a graph showing data after performing FFT, respectively;

DESCRIPTION OF THE PREFERRED EMBODIMENTS

Embodiment Mode 1

Figure 1:
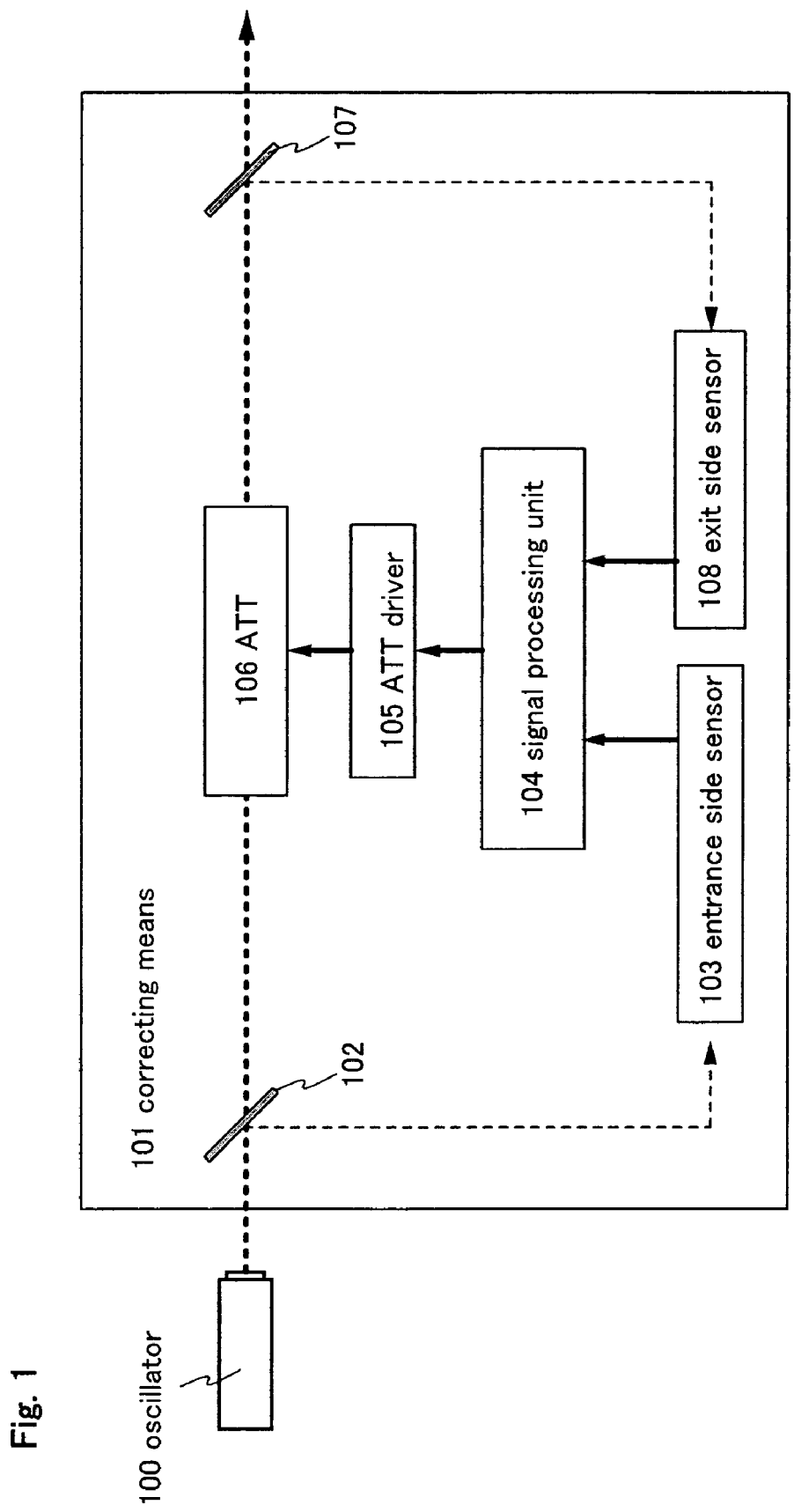
FIG. 1 is a block diagram showing a structure of a correcting means.

FIG. 1 is a block diagram of correcting means 101 of this embodiment mode. The correcting means 101 shown in FIG. 1 has an entrance side optical system 102, an entrance side sensor 103, a signal processing unit 104, an ATT driver 105, an ATT 106, an exit side optical system 107, and an exit side sensor 108.

The correcting means 101 shown in FIG. 1 samples laser beam on the entrance side of the ATT 106 and laser beam on the exit side of the ATT 106 both. Therefore, one optical system and one sensor are provided for sampling on each of the entrance side and the exit side. In FIG. 1, the entrance side optical system and the exit side optical system are discriminated from each other by denoting the former by reference symbol 102 and the latter by 107. The entrance side sensor and the exit side sensor are discriminated from each other by denoting the former by reference symbol 103 and the latter by 108.

The entrance side and the exit side are controlled by the same signal processing unit in this embodiment mode. Instead, the correcting means may have an entrance side signal processing unit and an exit side signal processing unit.

The correcting means 101 shown in FIG. 1 uses the entrance side optical system 102 to sample a part of laser beam on the entrance side of the ATT 106. The laser beam then enters the entrance side sensor 103, where the partial incident laser beam is converted into an electric signal. The electric signal is inputted to the signal processing unit 104.

On the other hand, the exit side optical system 107 samples a part of laser beam on the exit side of the ATT 106. The laser beam then enters the exit side sensor 108, where the partial incident laser beam is converted into an electric signal. The electric signal is inputted to the signal processing unit 104.

The entrance side sensor 103 and the exit side sensor 108 can be any photoelectric conversion element as long as it is capable of generating electric signals that contain laser beam energy fluctuation as data. For example, photo diodes, photo transistors, and CCD (charge coupled devices) are employable.

FIGS. 2A to 2E are graphs showing energy fluctuation of the sampled laser beam. Used here is a pulse oscillation excimer laser. The horizontal axis shows time (sec) and the vertical axis shows the relative ratio (%) of an energy level at each point of measurement to the average of measured energy levels.

The laser beam oscillation frequency is 10 Hz in FIG. 2A, 20 Hz in FIG. 2B, 30 Hz in FIG. 2C, 40 Hz in FIG. 2D, and 50 Hz in FIG. 2E.

The signal processing unit 104 performs signal processing on the two electric signals inputted. Out of energy fluctuation of each laser beam, periodic fluctuation is analyzed. For the signal processing, fast Fourier transformation and other various signal processings can be employed. The signal processing has to produce at least the frequency of periodic fluctuation out of energy fluctuation of the entrance side laser beam and the amplitude and phase of periodic fluctuation out of energy fluctuation of the exit side laser beam. The description here is about a case of using fast Fourier transformation for the signal processing.

Fast Fourier transformation is conducted using the computation program software IGOR Pro, a product of WaveMetrix, Inc. in accordance with the following Formula 1.

$$Fk = \sum_{m=0}^{N-1} fmW^{km} \quad \text{[Formula 1]}$$

$$(W = e^{2\pi i/n})$$

The frequency at which the peak level is highest and the peak level are obtained through frequency analysis by fast Fourier transformation. This frequency corresponds to energy fluctuation (periodic fluctuation) of the entrance side or exit side laser beam. Hereinafter, this frequency is referred to as periodic frequency. The relative peak level of the periodic frequency corresponds to the amplitude of the periodic fluctuation.

FIGS. 3A to 3E show data obtained by performing fast Fourier transformation on the data of FIGS. 2A to 2E. FIG. 3A, FIG. 3B, FIG. 3C, FIG. 3D, and FIG. 3E correspond to FIG. 2A, FIG. 2B, FIG. 2C, FIG. 2D, and FIG. 2E, respectively. The horizontal axis shows frequency (Hz) and the vertical axis shows amplitude.

Each of the graphs of FIGS. 3A to 3E has one extraordinarily high peak. Specifically, the peak is observed at 4.78 Hz in FIG. 3A, 4.78 Hz in FIG. 3B, 5.2275 Hz in FIG. 3C, 15.21 Hz in FIG. 3D, and 24.8 Hz in FIG. 3E. Each of these peak frequencies equal to the periodic frequency.

The signal processing unit 104 controls the ATT driver 105 in order that the transmittance of the ATT 106 changes at the same frequency as the periodic frequency of the entrance side laser beam. In addition, the peak intensity of the exit side laser beam which is obtained by FFT is monitored, and the ATT driver 105 is used to adjust the amplitude and phase of the transmittance of the ATT 106 in a manner that makes the monitored peak intensity lower.

FIG. 4A shows waveform depicting periodic fluctuation of laser beam energy which is calculated by fast Fourier transformation. The periodic frequency is given as 1/T. Then the cycle of the periodic fluctuation is expressed as T. A represents the amplitude of the periodic fluctuation of laser beam. FIG. 4B shows waveform depicting transmittance fluctuation which is generated from the periodic fluctuation waveform of FIG. 4A. The transmittance fluctuation waveform and the periodic fluctuation waveform have the same cycle, T, and are out of phase with each other by T/2. The amplitude of the transmittance is given as B.

The laser beam enters the ATT 106 to receive energy adjustment in accordance with the transmittance of the ATT 106. Then the laser beam exits from the correcting means 101.

With the above correcting means, laser apparatus of the present invention can prevent energy fluctuation of laser beam outputted from an oscillator 100. More specifically, periodic fluctuation in energy of the laser beam is prevented.

The amplitude B of the transmittance of the ATT is set in order that the exit side laser beam energy obtained when the transmittance is maximum and the exit side laser beam energy obtained when the transmittance is minimum are as close to each other as possible.

The amplitude B of the transmittance of the ATT may be adjusted while monitoring laser beam fluctuation after the laser beam is irradiated, or may be adjusted on the basis of the laser beam peak intensity obtained by FFT and the energy ratio of remaining laser beam that enters the ATT to the original incident laser beam.

Next, a detailed description is given on a phase control method which uses the phase or the phase angle of exit side laser beam.

FIG. 5A shows a case where the transmittance has an ideal phase. The waveform of entrance side laser beam is indicated by a dashed line and the waveform of exit side laser beam is indicated by a solid line. Note that the waveforms in FIG. 5A do not reflect fluctuation that takes place at a frequency lower than the oscillation frequency in order to make the waveforms of periodic fluctuation clearer. In FIG. 5A, the waveform of the entrance side laser beam and the waveform of the exit side laser beam are in phase with each other. It is therefore inferred that the transmittance fluctuation is out of phase with the periodic fluctuation of the entrance side laser beam by T/2. Then the amplitude of the transmittance is adjusted such that the amplitude A' of the exit side laser beam becomes smaller. In this way, the energy of the exit side laser beam is made steadier even more.

FIG. 5B shows a case where the transmittance phase is shifted not by T/2. The waveform of entrance side laser beam is indicated by a dashed line, and the waveform of exit side laser beam is indicated by a solid line. Note that, similar to FIG. 5A, the waveforms in FIG. 5B do not reflect fluctuation that takes place at a frequency lower than the oscillation frequency in order to make the waveforms of periodic fluctuation clearer. In FIG. 5B, the waveform of the entrance side laser beam and the waveform of the exit side laser beam are out of phase with each other. It is therefore inferred that the difference between the phase of the transmittance fluctuation and the phase of the periodic fluctuation of the entrance side laser beam is not T/2. In this case, the signal processing unit corrects the phase of the transmittance separately to prevent the periodic fluctuation of the exit side laser beam.

In this embodiment mode, the energy of exit side laser beam is monitored to adjust the amplitude and phase of the transmittance in a manner that makes the peak intensity of the exit side laser beam lower. However, other methods may be employed to adjust the phase. For example, the phase of the transmittance of the ATT 106 may be out of phase with the energy phase of entrance side laser beam by T/2 using as the reference a signal that is in synchronization with laser beam oscillation in the oscillator. Specifically, the transmittance phase and the entrance side laser energy phase are out of phase by T/2 by calculating the phase difference between the two using the phase difference from the phase of fluctuation of the entrance side laser beam, and using a signal whose frequency is known in advance (reference signal) and the periodic frequency of the entrance side laser beam.

In this case, if the amplitude is adjusted on the basis of the peak intensity of entrance side laser beam which is obtained by FFT and the energy ratio of remaining laser beam that enters the ATT to the original incident laser beam, monitoring energy fluctuation of exit side laser beam may be omitted. In short, the exit side optical system 107 and the exit side sensor 108 of the correcting means shown in FIG. 1 are dispensable, and it is one way to make the correcting means compact. However, it is also true that the stability of laser beam energy is obtained more securely by monitoring exit side laser beam as shown in FIG. 1.

Alternatively, the above correcting means may have a memory or the like to store information regarding the fluctuation frequency and amplitude of the transmittance of the ATT which is determined by the signal processing unit.

In this way, the fluctuation frequency and amplitude of the transmittance of the ATT do not need adjustment from the next time on.

This embodiment mode uses an ATT as the light amount adjusting means, but the present invention is not limited thereto. Any means can be used as the light amount adjusting means in the present invention if it is capable of controlling the energy of laser beam emitted from an oscillator.

The present invention can also prevent noncyclic energy fluctuation if the transmittance of the ATT can be controlled fast enough to make laser beam reflect monitor results instantly.

Embodiment Mode 2

Figure 6:
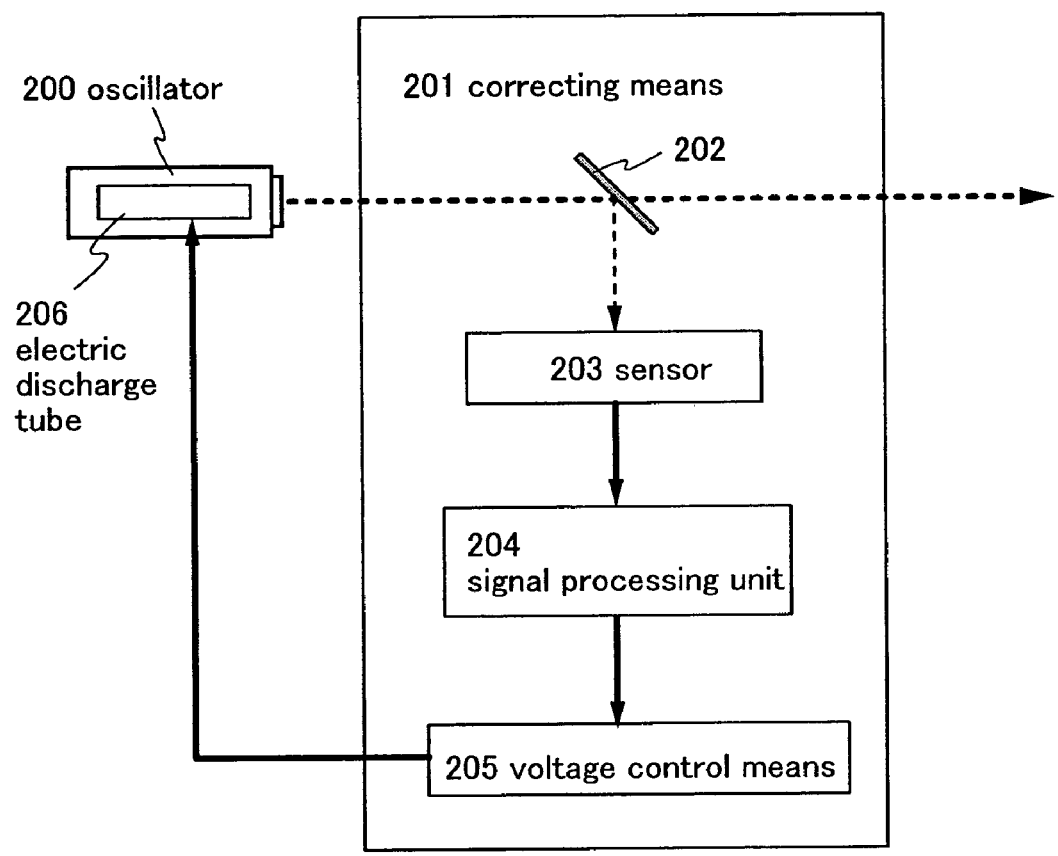
FIG. 6 is a block diagram showing a structure of a correcting means.

FIG. 6 is a block diagram of correcting means 201 of this embodiment mode. The correcting means 201 shown in FIG. 6 has an optical system 202, a sensor 203, a signal processing unit 204, a voltage controlling means 205, and an electric discharge tube 206.

The correcting means 201 shown in FIG. 6 uses the optical system 202 to sample a part of laser beam emitted from the oscillator 200. The laser beam then enters the sensor 203, where the partial incident laser beam is converted into an electric signal. The electric signal is inputted to the signal processing unit 204. The sensor 203 can be any photoelectric conversion element as long as it is capable of generating an electric signal that contains laser beam energy fluctuation as data.

The signal processing unit 204 performs signal processing on the electric signal inputted. Out of energy fluctuation of the laser beam, periodic fluctuation is analyzed. For the signal processing, fast Fourier transformation and other various signal processing methods can be employed. The signal processing has to produce at least the frequency and amplitude of periodic fluctuation out of energy fluctuation of the laser beam. The description here is about a case of using fast Fourier transformation for the signal processing.

When laser beam energy fluctuates periodically, one frequency that induces the highest peak and the peak level are obtained through frequency analysis by fast Fourier transformation. This frequency (periodic frequency) corresponds to periodic fluctuation. The relative peak level of the periodic frequency corresponds to the amplitude of the periodic fluctuation.

The signal processing unit 204 controls the voltage control means 205 such that the voltage to be applied to the electric discharge tube 206 changes at the same frequency as the periodic frequency of the laser beam. Specifically, an opposite-phase voltage is superimposed on the voltage of the electric discharge tube. In addition, the peak intensity of the laser beam which is obtained by FFT is monitored, and the voltage controlling means 205 is used to adjust the amplitude and phase of the voltage to be applied to the electric discharge tube 206 in a manner that makes the monitored peak intensity lower.

The energy of laser beam emitted from an oscillator 200 is adjusted by the voltage applied to the electric discharge tube 206.

With the above correcting means, laser apparatus of the present invention can prevent energy fluctuation of laser beam outputted from the oscillator 200. More specifically, periodic fluctuation in energy of the laser beam is prevented.

The amplitude of the voltage to be applied to the electric discharge tube 206 is set in order that the laser beam energy obtained when this voltage is maximum and the laser beam energy obtained when the voltage is minimum are as close to each other as possible.

In this embodiment mode, the energy of laser beam is monitored to adjust the amplitude and phase of the voltage in a manner that makes the peak intensity of the laser beam lower. However, other methods may be employed to adjust the phase. For example, the phase of the voltage to be applied to the electric discharge tube 206 may be in antiphase to the laser beam energy phase using as the reference a signal that is in synchronization with laser beam oscillation in the oscillator. Specifically, the voltage phase and the laser energy phase are made in antiphase using the phase difference obtained by comparing the phase difference from the phase of fluctuation of the laser beam, a signal whose frequency is known in advance (reference signal), and the electric signal obtained through sampling of the laser beam with one another.

Alternatively, the above correcting means may have a memory or the like to store information regarding the frequency and amplitude of the voltage to be applied to the electric discharge tube which is determined by the signal processing unit. In this way, the frequency and amplitude of the voltage to be applied to the electric discharge tube do not need adjustment from the next time on.

The present invention can also prevent noncyclic energy fluctuation if the voltage to be applied to the electric discharge tube can be controlled at such a response speed that monitor results are instantly reflected on laser beam.

Embodiments of the present invention are described below.

Embodiment 1

Periodic fluctuation of laser beam energy varies depending on the oscillation frequency of an oscillator. This embodiment gives a description on the relation between the oscillation frequency of laser beam emitted from an excimer laser oscillator and the frequency of periodic fluctuation.

Figure 7:
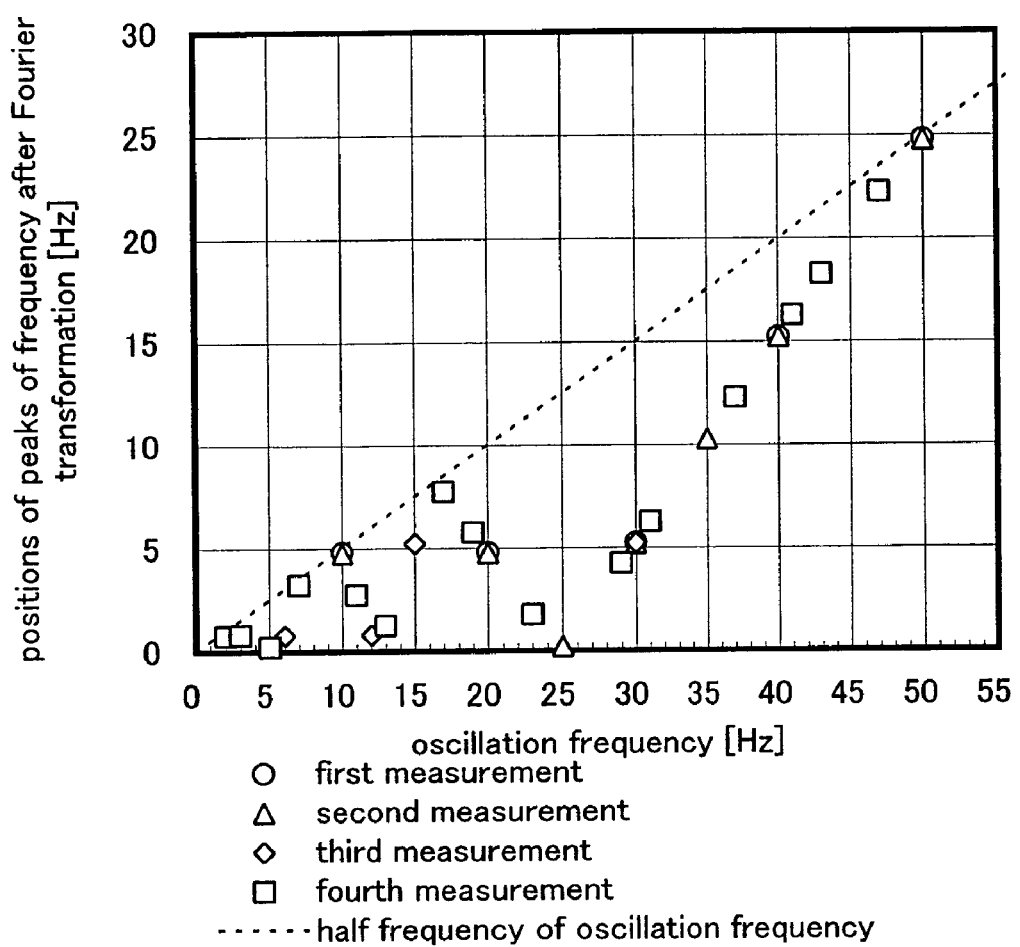
FIG. 7 is a graph showing a relationship between an oscillation frequency and a position of a peak of a frequency after performing Fourier transform.

FIG. 7 shows the relation between the laser beam oscillation frequency (Hz) and the highest peak frequency (Hz) obtained by Fourier transformation. The horizontal axis indicates the oscillation frequency (Hz), and the vertical axis indicates the peak position (Hz) after Fourier transformation. Although measurements have been taken on different days, equal measurement conditions have been used except the oscillation frequency.

The peak frequency obtained by Fourier transformation means the frequency of periodic fluctuation of laser beam energy. The frequency of the periodic fluctuation repeatedly rises and drops in stages. Specifically, the frequency of the periodic fluctuation reaches its local minimal value when the oscillation frequency is about 5 Hz, 12 Hz, and 25 Hz and reaches its local maximal value when the oscillation frequency is about 3 Hz, 10 Hz, and 17 Hz. After the oscillation frequency exceeds a point around 25 Hz, the periodic fluctuation frequency just continues to increase.

Studying in advance the relation between the oscillation frequency and periodic fluctuation frequency of laser beam used as shown in FIG. 7 is helpful in finding the optimum condition for laser beam irradiation of a target. For instance, gaps between lateral streaks on a semiconductor film which are caused by periodic fluctuation can be narrowed enough to avoid visual recognition by choosing a laser beam irradiation condition that makes the periodic fluctuation frequency high. On the other hand, if a laser beam irradiation condition that makes the periodic fluctuation frequency low is chosen, gaps between lateral streaks on a semiconductor film which are caused by periodic fluctuation can be widened until the lateral streaks recede from the irradiation region.

Based on the data in FIG. 7, a predicted gap between lateral streaks is calculated for each oscillation frequency when a semiconductor film is irradiated with laser beam in about thirteen shots, which is the same shot number as the one in crystallization of a semiconductor film by the standard laser beam irradiation conditions (oscillation frequency: 30 Hz, scan rate: 1.0 mm/sec). Specifically, the calculation employs the following Formula 2.

$$d(w) = \frac{\omega}{\omega_0} \times \frac{v_0}{T(\omega)} \quad \text{[Formula 2]}$$

wherein $d(\omega)$ represents the gap cycle of the lateral streaks, $\omega$ represents the oscillation frequency, $\omega_o$ represents the oscillation frequency under the standard irradiation conditions (=30 Hz), $v_o$ represents the substrate scan rate under the standard irradiation conditions (=1.0 mm/sec), and $T(\omega)$ represents the frequency of periodic fluctuation.

Figure 14:
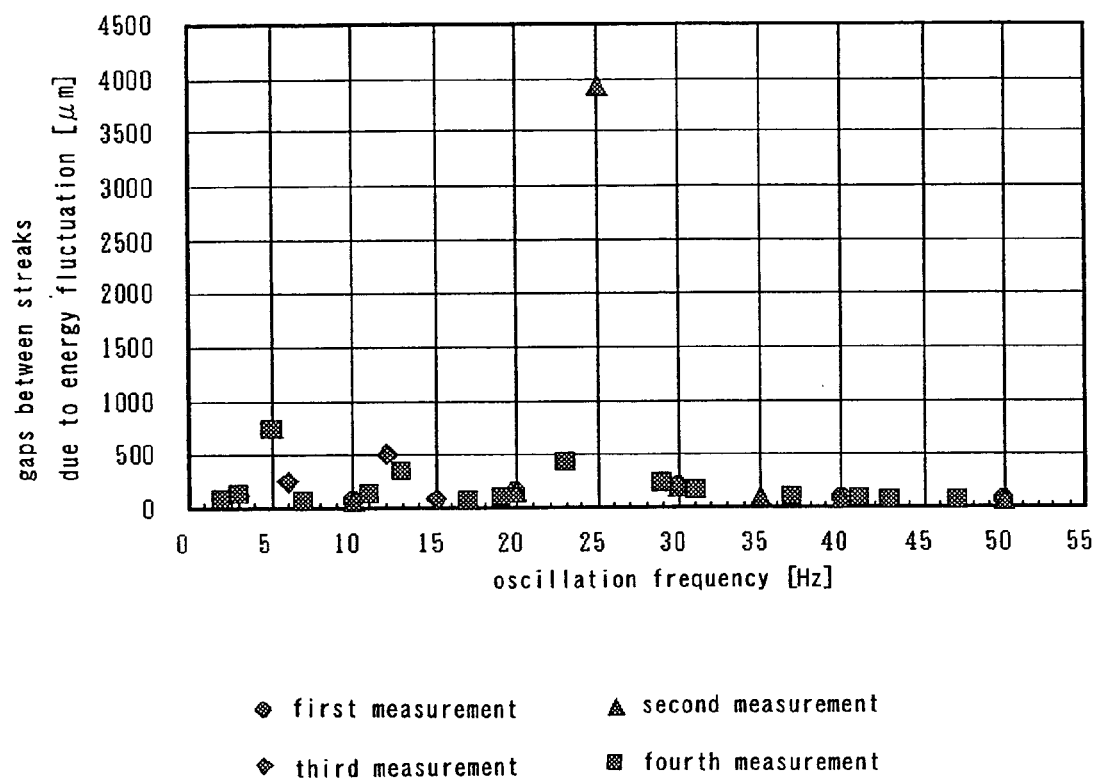
FIG. 14 is a graph showing a relationship oscillation frequency and intervals of lateral streaks in setting a shot number according to a standard condition.

The relation of the lateral streak cycle to the oscillation frequency which is calculated from Formula 2 is shown in FIG. 14. A characteristic peak appears when the oscillation frequency $\omega$ is 25 Hz, and it is predicted that the gap between the lateral streaks at 25 Hz is about 3.9 mm. When the oscillation frequency is other than 25 Hz, the gap is within a range about between 60 μm and 500 μm. The estimated substrate scan rate at 25 Hz is 0.833 mm/sec if the shot number matches the shot number under the standard conditions (30 Hz, 1.0 mm/sec).

Embodiment 2

This embodiment shows the relation of the energy conversion coefficient (%) and the energy density (mJ/cm$^2$) to the angle of a mirror in an ATT. The energy conversion coefficient in the present invention is synonymous with the transmittance.

Figure 8:
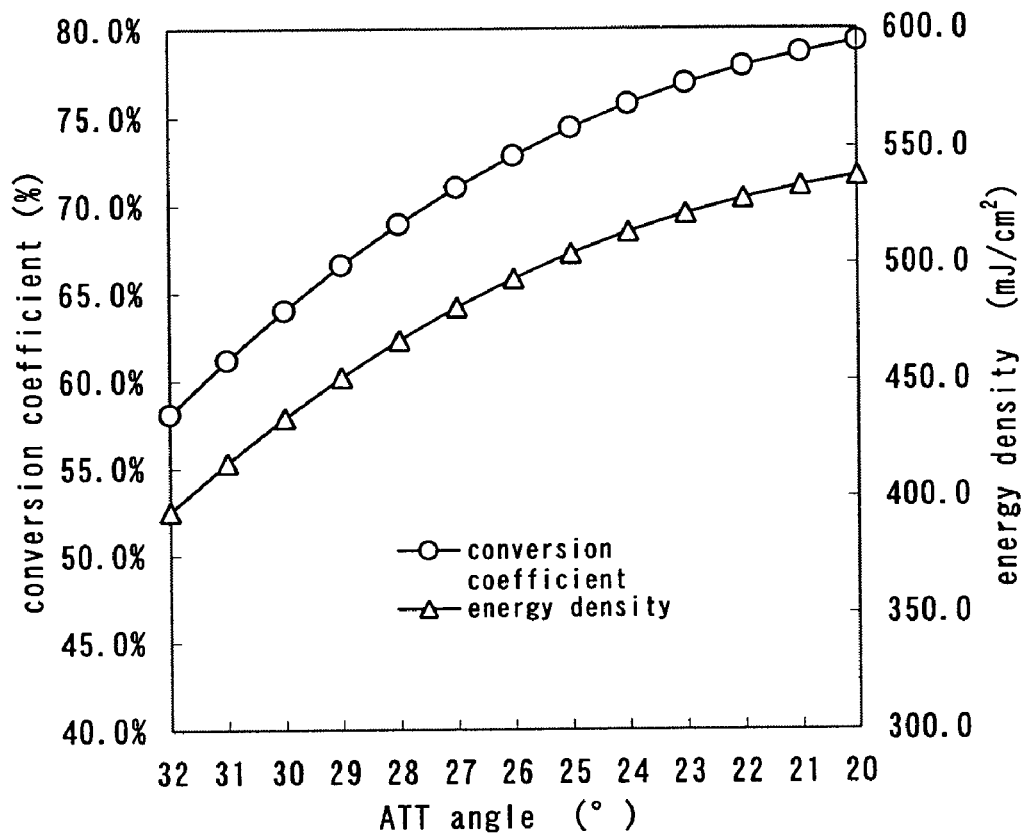
FIG. 8 is a graph showing a relationship between an energy density and a conversion coefficient to an angle of ATT.
Figure 11:
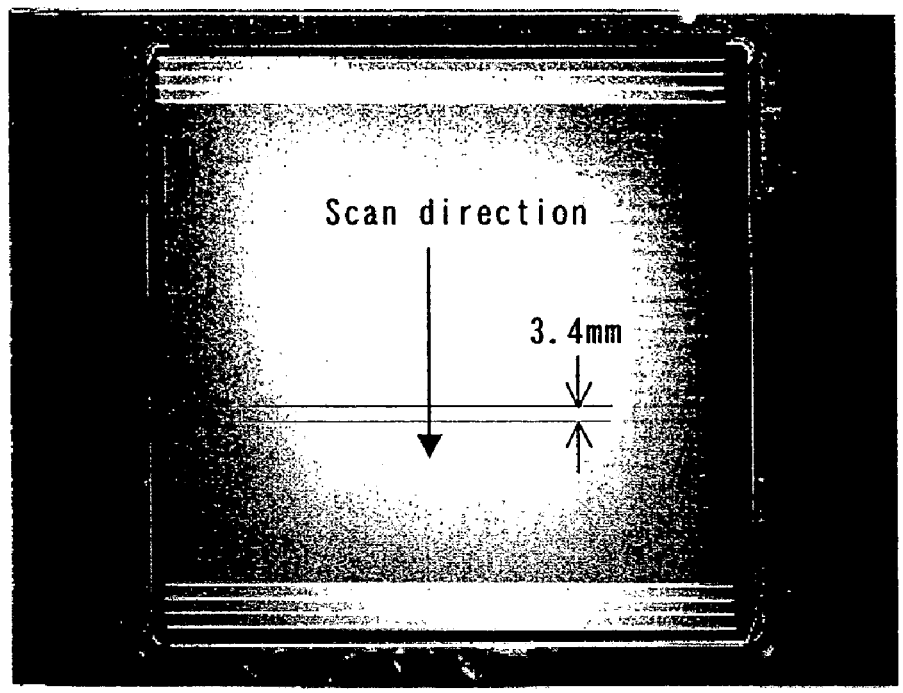
FIG. 11 is a photograph of top view of a semiconductor film crystallized by irradiating a laser beam from an excimer laser.
Figure 12:
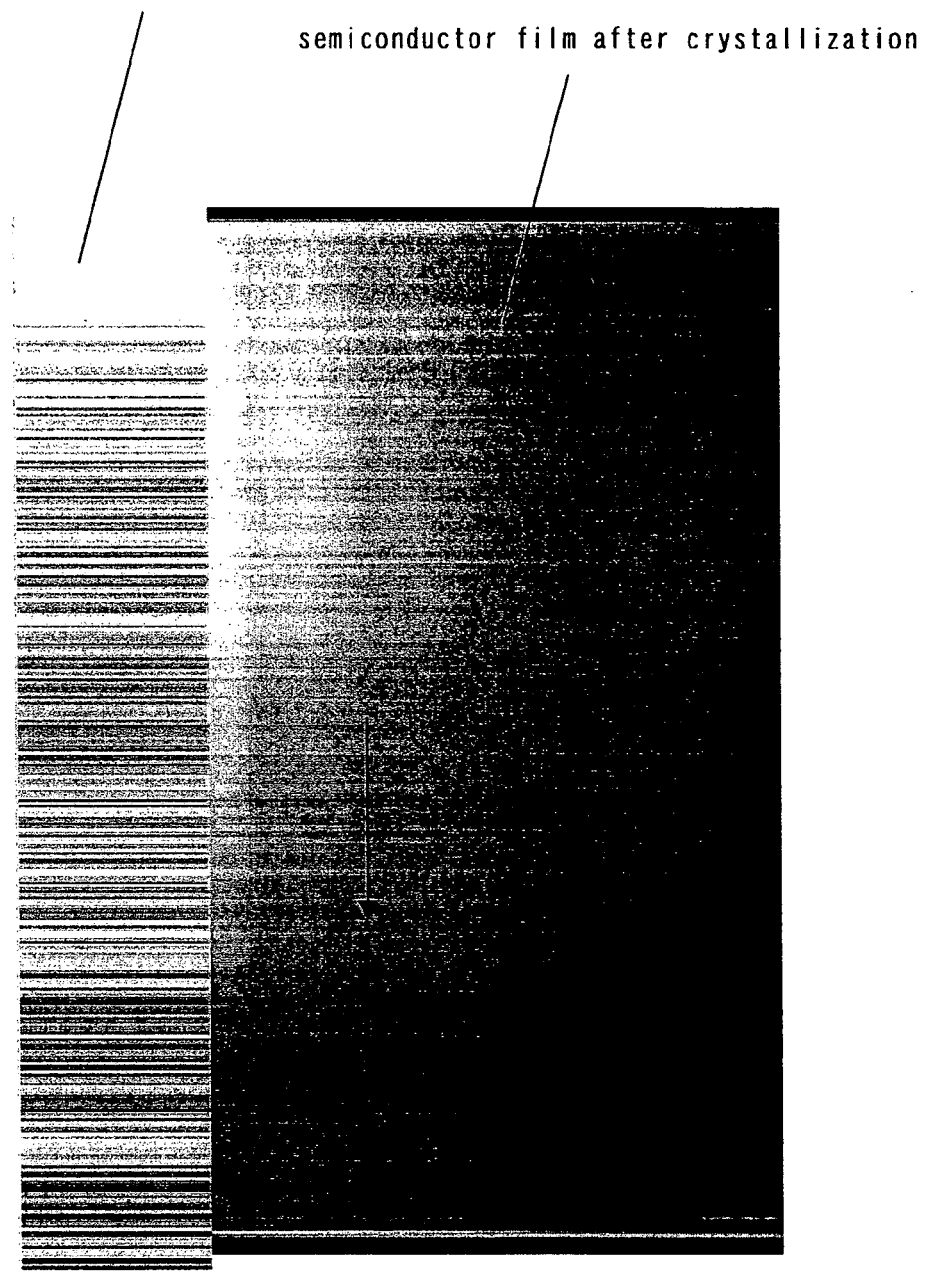
FIG. 12 shows a photograph of top view of a crystallized semiconductor film and a drawing showing energy value of a laser beam with gradation in piles.
Figure 13:
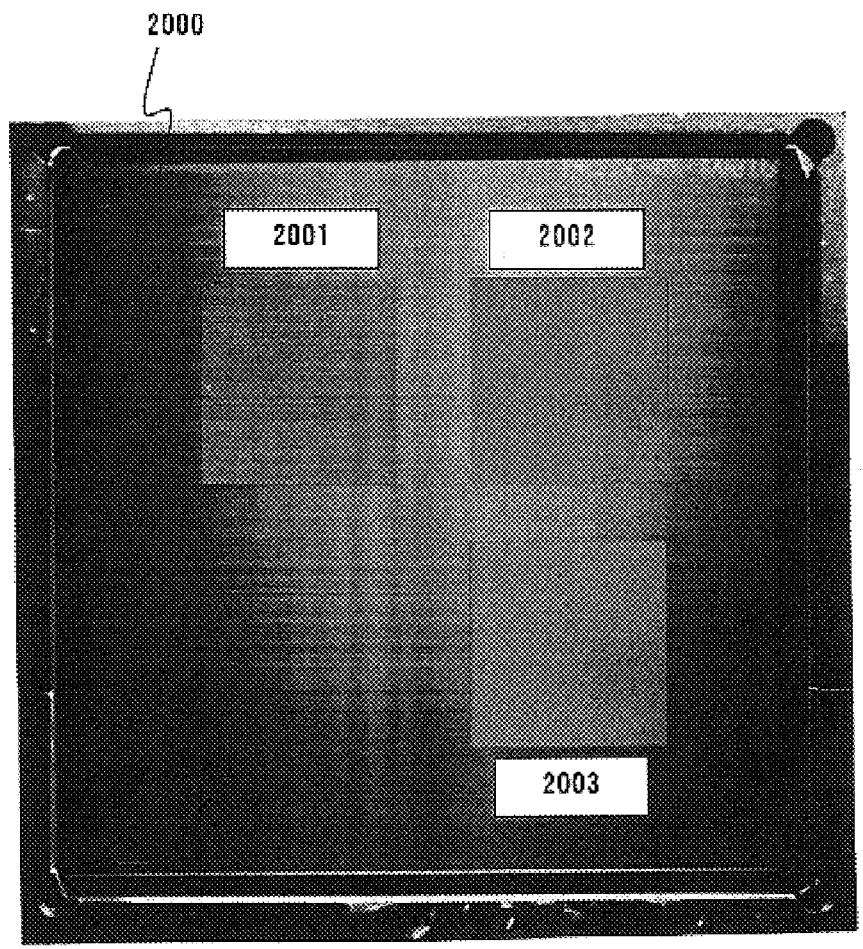
FIG. 13 is a photograph of top view of a crystallized semiconductor film and a photograph of a pixel portion in a light emitting device formed with the semiconductor film.

In FIG. 8, the horizontal axis shows the angle (°) of an ATT. One vertical axis shows the energy conversion coefficient (%), and the other vertical axis shows the energy density (mJ/cm$^2$).

For example, assuming that when laser beam is oscillated so as to set the angle of the ATT to 30.7°, the conversion coefficient to 62%, and the energy density to 420 mJ/cm$^2$, laser beam actually outputted fluctuates within 420±25 mJ/cm$^2$.

In order to prevent this laser beam energy fluctuation, the ATT is controlled in order that laser beam fluctuates in antiphase to the phase of the energy fluctuation, setting the energy density to ±25 mJ/cm$^2$.

Specifically, the ATT is controlled such that, when laser beam having the maximum energy density (445 mJ/cm$^2$) is emitted from an oscillator, the ATT angle is set to 32.0°, the conversion coefficient is set to 58%, and the energy density is set to −25 mJ/cm$^2$. On the other hand, the ATT is controlled in order that, when laser beam having the minimum energy density (395 mJ/cm$^2$) is emitted from the oscillator, the ATT angle is set to 29.4°, the conversion coefficient is set to 67%, and the energy density is set to +25 mJ/cm$^2$.

The ATT angle, the conversion coefficient, and the energy density are not limited to the relation shown in FIG. 8. The conversion coefficient and the ATT angle are determined to suite characteristics of an ATT employed.

Although the example described in this embodiment deals with controlling energy fluctuation through one light amount adjusting means, the present invention is not limited thereto. Tow or more light amount adjusting means may be employed instead of one. For instance, the present invention can employ light amount adjusting means with a fixed transmittance and light amount adjusting means with a variable transmittance for preventing energy fluctuation in combination.

The example described in this embodiment uses an ATT in which the transmittance is controlled by adjusting the angle of a mirror. The ATT may be replaced by a concentration-variable filter, the transmittance of which changes continuously or in stages along one direction of a substrate.

This embodiment can be combined with Embodiment 1.

Embodiment 3

In the present embodiment, one example of a laser apparatus of the present invention shown in Embodiment Mode 1 is given.

FIG. 9 shows a structure of a laser apparatus according to the present invention. Energy of a laser beam oscillated from an oscillator 1500 is corrected in a correcting means 1501 and the laser beam is incident into a beam expander 1508.

In the present embodiment, a shutter 1502 to block a laser beam is provided between the correcting means 1501 and the beam expander 1508, but it is not always necessary to provide the shutter.

Expansion of the incident laser beam is suppressed by the beam expander 1508, and at the same time, the size of a beam spot can be adjusted.

A form of the beam spot of the laser beam irradiated from the beam expander 1508 is condensed into a rectangle, ellipse or line form in the a beam homogenizer 1509. The focused laser beam is reflected off by a mirror 1510 and incident to a lens 1511. The incident laser beam is focused again with the lens 1511 and irradiated on a substrate 1514 in which a semiconductor film is formed. In the present embodiment, a cylindrical lens is used as the lens 1511.

The substrate 1514 is installed on a stage 1515 and the position of the stage 1515 is controlled by three position control means (driver) 1516 to 1518. Specifically, the stage 1515 can be rotated by a $\phi$ direction position control means 1516 in a horizontal plane. Further, the stage 1515 can be moved in an X direction by an X direction position control means 1517 in the horizontal plane, while the stage 1515 is moved in a Y direction by a direction position control means 1518 in the horizontal plane. Operations of the position control means are controlled by a central processing unit (CPU) 1519.

A position to irradiate a laser beam on the substrate 1514 can be controlled by controlling the above three position control means. The irradiation of the laser beam is performed so that the beam spots of the laser beams in the semiconductor film are overlapped with each other in a scanning line.

It is noted that a monitor 1512 using such a photo acceptance unit as a CCD (Charge-Coupled Device) may be provided to grasp the accurate position of the substrate.

The present embodiment can freely be implemented with Embodiment 1 or Embodiment 2.

Employing a light amount adjusting means for adjusting a laser beam energy density makes it possible to control a laser beam energy density with precision. Therefore, laser beam fluctuation can be cancelled out more securely than by the conventional method which uses a transducer and an obtained laser beam can have steadier energy. More specifically, periodic fluctuation of energy rather than oscillation cycle of a laser beam can be suppressed.

According to the present invention, controlling the voltage to be applied to an electric discharge tube of an oscillator makes it possible to control a laser beam energy density with precision. Therefore, laser beam fluctuation can be cancelled out more securely than by the conventional method which uses a transducer and an obtained laser beam can have steadier energy. More specifically, periodic fluctuation rather than oscillation cycle of a laser beam can be suppressed.

What is claimed is:

1. A laser apparatus comprising:
   a laser oscillator;
   an optical system for sampling a part of a laser beam emitted from the laser oscillator;
   an electric signal generator for generating an electric signal that contains an energy fluctuation of the laser beam as a data using the part of the laser beam sampled;
   a light amount adjuster for adjusting an energy of the laser beam emitted from the laser oscillator by changing a transmittance thereof; and
   a signal processing unit for subjecting the electric signal to a signal processing to calculate a frequency, an amplitude, and a phase of the energy fluctuation of the laser beam.

2. A laser apparatus according to claim 1, wherein the signal processing unit controls the transmittance such that a phase of the transmittance change in antiphase to the phase of the energy fluctuation of the laser beam and with an amplitude of the transmittance capable of reducing the amplitude of the energy fluctuation of the laser beam emitted from the laser oscillator, the control being made based on a phase difference between a phase of a signal that is in synchronization with an oscillation of the laser beam emitted from the laser oscillator and the phase calculated, on the energy ratio of the sampled laser beam to the laser beam emitted from the laser oscillator, and on the frequency and the amplitude calculated.

3. A laser apparatus comprising:
   a laser oscillator;
   a light amount adjuster for adjusting an energy of an incident laser beam by changing a transmittance thereof;
   a driver for controlling the transmittance of the light amount adjuster;
   an entrance side optical system for sampling a part of the laser beam that enters the light amount adjustor;
   a first electric signal generator for generating a first electric signal that contains as a data an energy fluctuation of the laser beam that enters the light amount adjuster using the part of the laser beam sampled by the entrance side optical system;
   an exit side optical system for sampling a part of a laser beam of which the energy has been adjusted by the light amount adjuster;
   a second electric signal generator for generating a second electric signal that contains as a data an energy fluctuation of the laser beam of which the energy has been adjusted by the light amount adjuster using the part of the laser beam sampled by the exit side optical system; and
   a signal processing unit for subjecting the first electric signal and the second electric signal to calculate a frequency, an amplitude, and a phase of the energy fluctuation of the laser beam to grasp a state of the energy fluctuation of the laser beam that enters the light amount adjuster as well as a state of the energy fluctuation of the laser beam whose energy has been adjusted by the light amount adjuster.

4. A laser apparatus according to claim 3, wherein the signal processing unit controls the driver such that a phase of the transmittance changes in antiphase to the phase of energy fluctuation of the laser beam that enters the light amount adjuster.

5. A laser apparatus according to claim 3, further comprising a stage,
   wherein the stage is located so that a substrate over the stage is irradiated with the laser beam which has transmitted through the exit side optical system.

6. A laser apparatus comprising:
   a laser oscillator;
   an optical system for sampling a part of a laser beam emitted from the laser oscillator;
   a sensor for receiving the sampled laser beam and converting the sampled laser beam to an electric signal;
   a signal processing unit for processing the electric signal for calculating at least a frequency, an amplitude and a phase of an energy fluctuation of the laser beam;
   an attenuator for attenuating a laser beam emitted from the laser oscillator by using the frequency, amplitude and the phase of the energy fluctuation of the laser beam calculated by the signal processing unit.

7. A laser apparatus comprising:
   a laser oscillator;
   an attenuator for attenuating a first laser beam emitted from the laser oscillator and generating a second laser beam;
   a first optical system for sampling a part of the first laser beam;
   a second optical system for sampling a part of the second laser beam;
   a first optical sensor for receiving the sampled first laser beam and converting the sampled first laser beam to a first electric signal;
   a second optical sensor for receiving the sampled second laser beam and converting the sampled second laser beam to a second electric signal;
   a signal processing unit for processing the first electric signal and the second electric signal for calculating at least a frequency, an amplitude and a phase of an energy fluctuation of the first laser beam and at least a frequency, an amplitude and a phase of an energy fluctuation of the second laser beam; and
   a driver for controlling a transmittance of the attenuator.

8. A laser apparatus according to claim 7, further comprising a stage,
   wherein the stage is located so that a substrate over the stage is irradiated with the laser beam which has transmitted through the second optical system.

* * * * *